(12) United States Patent
Fessler-Knobel et al.

(10) Patent No.: US 9,346,141 B2
(45) Date of Patent: May 24, 2016

(54) DEVICE AND METHOD FOR ARRANGING A COMPONENT ON A COMPONENT CARRIER

(75) Inventors: Martin Fessler-Knobel, Munich (DE); Roland Huttner, Jesenwang (DE)

(73) Assignee: MTU Aero Engines GmbH, Munich (DE)

( * ) Notice: Subject to any disclaimer, the term of this patent is extended or adjusted under 35 U.S.C. 154(b) by 141 days.

(21) Appl. No.: 13/382,657

(22) PCT Filed: Jul. 7, 2010

(86) PCT No.: PCT/DE2010/000784
§ 371 (c)(1),
(2), (4) Date: Mar. 23, 2012

(87) PCT Pub. No.: WO2011/003399
PCT Pub. Date: Jan. 13, 2011

(65) Prior Publication Data
US 2012/0175055 A1     Jul. 12, 2012

(30) Foreign Application Priority Data

Jul. 9, 2009   (DE) .................. 10 2009 032 703

(51) Int. Cl.
*B23Q 3/08*     (2006.01)
*F01D 5/28*     (2006.01)
*B23Q 3/06*     (2006.01)
*F16B 11/00*    (2006.01)

(52) U.S. Cl.
CPC ............... *B23Q 3/084* (2013.01); *B23Q 3/063* (2013.01); *F01D 5/28* (2013.01); *F05D 2230/50* (2013.01); *F16B 11/006* (2013.01); *Y10T 29/53039* (2015.01); *Y10T 29/53961* (2015.01); *Y10T 156/10* (2015.01)

(58) Field of Classification Search
CPC .......... B23Q 3/08; B23Q 3/084; B23Q 3/086; B23Q 3/063; B23P 15/02; F01D 5/28; Y10T 156/10; Y10T 29/53039; Y10T 29/53961; F05D 2230/50; F16B 11/006
USPC ........... 156/275.5, 272.2, 272.8, 379.6, 380.9
See application file for complete search history.

(56) References Cited

U.S. PATENT DOCUMENTS

| 5,380,387 A | 1/1995 | Salamon et al. |
| 8,062,462 B2 | 11/2011 | Sandmeier |
| 8,623,165 B2 | 1/2014 | Fessler-Knobel et al. |
| 2009/0025220 A1* | 1/2009 | Fessler-Knobel ............ 29/889.7 |
| 2013/0052331 A1* | 2/2013 | Kram et al. .................. 427/2.11 |

FOREIGN PATENT DOCUMENTS

| DE | 199 38 851 B4 | 3/2001 |
| DE | 10 2007 020 957 A1 | 11/2008 |
| EP | 1 947 156 A1 | 7/2008 |

(Continued)

OTHER PUBLICATIONS

PCT/DE2010/000784 PCT/ISA/210, dated May 11, 2011, 3 pages.

*Primary Examiner* — Michael N Orlando
*Assistant Examiner* — Elizabeth Bradford
(74) *Attorney, Agent, or Firm* — Crowell & Moring LLP

(57) ABSTRACT

A joining device for arranging a component on a component carrier is disclosed. The joining device includes an application system for positioning the component in the joining device and a receptacle for clamping the component carrier in the joining device. The component is arranged on the component carrier by an adapter. A method for arranging the component on the component carrier is also disclosed.

3 Claims, 2 Drawing Sheets

(56) References Cited

FOREIGN PATENT DOCUMENTS

| | | |
|---|---|---|
| JP | 2001-54945 A | 2/2001 |
| WO | WO 01/97707 A1 | 12/2001 |
| WO | WO 02/45614 A1 | 6/2002 |
| WO | WO 2004/014587 A2 | 2/2004 |
| WO | WO 2010/105612 A1 | 9/2010 |
| WO | WO 2010/130249 A1 | 11/2010 |

* cited by examiner

DEVICE AND METHOD FOR ARRANGING A COMPONENT ON A COMPONENT CARRIER

BACKGROUND AND SUMMARY OF THE INVENTION

This application claims the priority of International Application No. PCT/DE2010/000784, filed Jul. 7, 2010, and German Patent Document No. 10 2009 032 703.7, filed Jul. 9, 2009, the disclosures of which are expressly incorporated by reference herein.

The invention relates to a device for arranging a component on a component carrier and a method for arranging a component on such a component carrier.

Fastening to-be-processed components on a component carrier by means of an adhesive connection is known. Known joining devices of this type provide for the component to be positioned in a device-side application system and then for the component to be aligned by means of the application system with the positionally fixed component carrier. An adhesive gap between the component and the component carrier that arises during this process is produced by the shape of the component and is therefore directly influenced by the geometrical tolerances of the component.

Similarly, aligning the component without a referencing to the component carrier and connecting it to this is known. Such a variant is shown for example in German Patent Document No. DE 10 2007 020 957 A1. With this variant, an adhesive gap may be adjusted in an optimum manner between the component and the component carrier, however, it is always necessary to individually measure the component on the component carrier and subsequently correct the axes in the respective processing machines.

The object of the invention is producing a device and a method for arranging a component on a component carrier which eliminates the aforementioned disadvantages and permits a precise positioning and arrangement of the component with or on the component carrier with an optimum adhesive gap.

A joining device according to the invention for arranging a component on a component carrier comprises an application system for positioning the component in the joining device and a receptacle for clamping the component carrier in the joining device. According to the invention, an adapter is provided for arranging the component on the component carrier.

Thus, the component is not directly fixed on the component carrier, rather indirectly by means of an adapter or an intermediate piece. As a result, the application system of the component has a fixed relationship to the application system of the component carrier. The component may be precisely connected to the component carrier and, at the same time, an optimum adhesive gap and thus an optimum adhesive connection may be adjusted between the adapter and the component. The adhesive gap may be adapted to the respective requirements of the adhesive. Shape deviations in the component are not compensated for by the thickness of the adhesive gap as in the prior art, rather by the position of the adapter in relation to the component and the component carrier.

In the case of a preferred exemplary embodiment, the adapter has at least one close-contoured joining surface facing a component surface and a connecting surface facing a component carrier surface. The close-contoured joining surface allows compliance with a pre-set optimum adhesive gap between the component and the adapter when shifting the adapter towards the component.

For improved gap formation, it is advantageous if the joining surface is smaller than the component surface and therefore only a section of the component surface is covered.

The curing of the adhesive may be further improved if a plurality of joining surfaces is provided, which are spaced relatively far apart from one another in order to achieve a greatest possible stiffness of the component. One variant provides, for example, that the adapter be configured as a grid.

In the case of one exemplary embodiment, the adapter is made of a translucent basic body at least in sections, for example quartz glass. Because of this, a radiation source emitting electro-magnetic radiation may be arranged on a side of the adapter facing away from the joining surface so that the adapter is situated between the component and the radiation source and the joining device can be designed compactly. For example, the adapter may be provided with recesses that are filled with translucent material.

To achieve a high freedom of design of the joining surface, one variant provides that the same be manufactured of a different material than the basic body of the adapter.

Corresponding sensors may be provided for controlling the target position of the component in the application system of the device.

The component carrier is preferably positionally fixed in the receptacle of the device so that inadvertent changes in the position of the component carrier are prevented.

Corresponding sensors may be provided for controlling the target position of the component carrier in the receptacle.

In one exemplary embodiment, the component carrier is a base plate of a zero-point clamping system. This makes it possible to quickly and simply equip a subsequent processing machine that receives the processing plate with the component.

To secure the adapter and the component in their aligned positions when curing the adhesive, support elements, for example spring elements, may be provided for supporting the adapter.

With a method according to the invention for arranging a component on a component carrier, the component carrier is aligned and positionally fixed in a receptacle of a joining device. Then an application system of the joining device is adjusted and the component is positioned on the application system. An adapter is subsequently provided for connecting the component to the component carrier. Afterwards, an adhesive connection is established between the adapter and the component while adjusting a target gap between the adapter and the component. Then an adhesive connection is established between the adapter and the component carrier while maintaining the target gap between the adapter and the component. Finally, the adhesive connections are cured.

With a preferred exemplary embodiment, the curing of the adhesive takes place using a different type of radiation than the releasing of the adhesive connections, for example by means of electro-magnetic radiation. The radiation used for releasing may be selected in this case such that the bond is heated and therefore damaged.

Other advantageous exemplary embodiments are the subject matter of further dependent claims.

Preferred exemplary embodiments of the invention are explained in greater detail in the following on the basis of schematic representations.

DETAILED DESCRIPTION OF THE DRAWINGS

Figure 1:
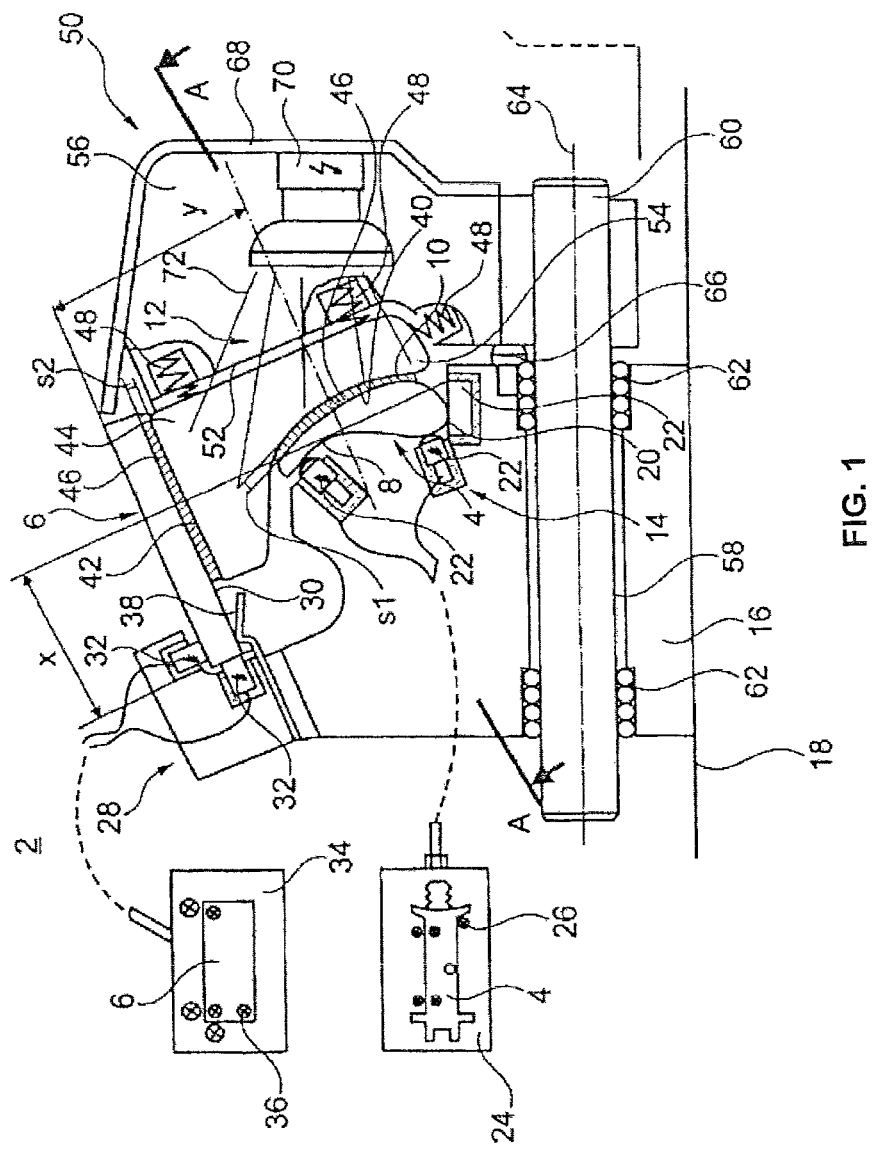
FIG. 1 is a cut-away side view of a first exemplary embodiment of the invention.

FIG. 1 shows a joining device 2 according to the invention for arranging and aligning a component 4 on a component body 6. The component 4 is depicted as a turbine or compressor blade of an aircraft engine and has a rotor blade with an approximately concave surface 8 and an approximately convex surface 10 facing away from the concave surface.

According to the invention, the component 4 is arranged on the component carrier 6 by means of an adapter 12 and positioned in an application system 14 of the joining device 2. The application system 14 is configured on a side section of a base body 16 of the joining device, the base section of which is supported on a work floor 18. Six electric sensors 22 are provided in the depicted exemplary embodiment to check the correct position in the application system 14, and they engage on the component 4 in the region of the concave surface 8 and a leading edge 20. However, only two sensors 22 are visible in the selected representation. The sensors 22 are connected to a display panel 24, which has a control lamp 26 assigned to each sensor 22, which transmits an optical signal in the case of correct or defective positioning.

The component carrier 6 is a base plate or bottom plate of a zero-point clamping system, the edge section of which is positionally fixed in a receptacle 28 of the joining device 2. It is designed as a standard interface for a component family with a flat fastening surface 30 for connecting the adapter 12.

Figure 2:
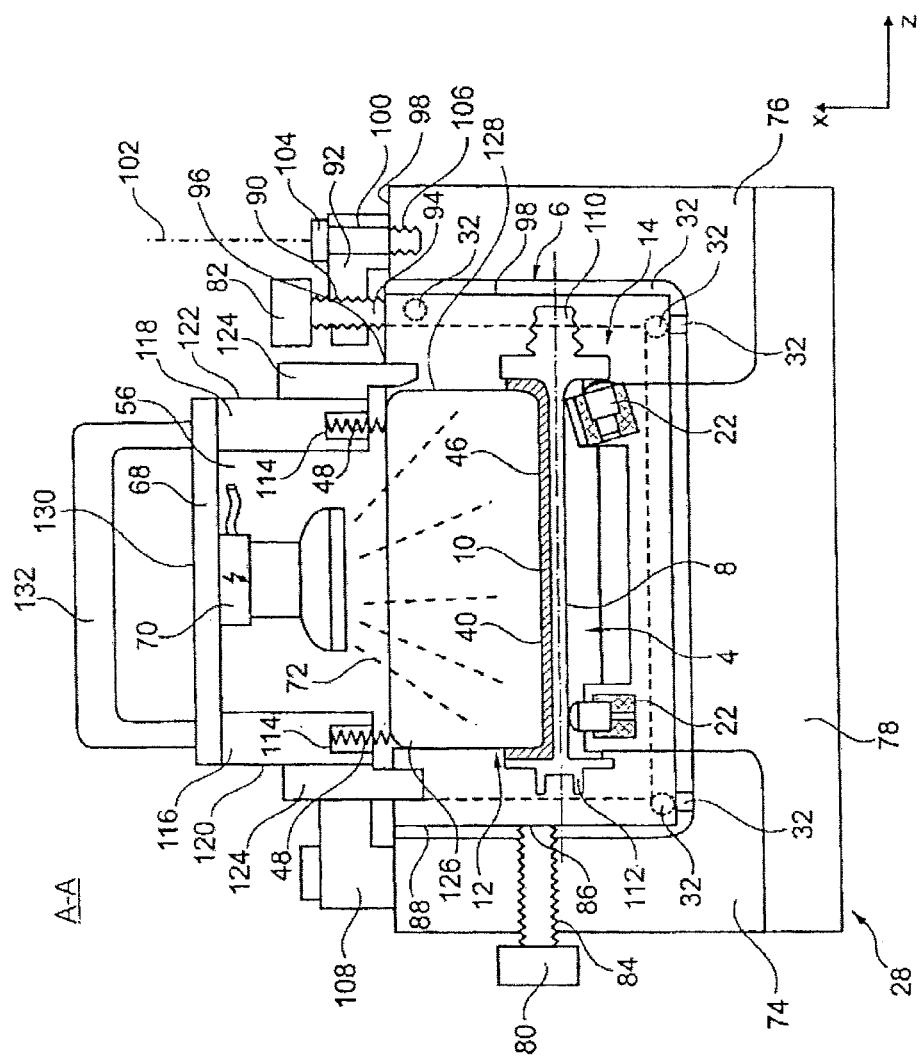
FIG. 2 is a section along line A-A of FIG. 1.

The receptacle 28 is firmly connected to a head section of the base body 16 and configured to be U-shaped as shown in FIG. 2. Six electrical sensors 32 are provided for checking the position of the component carrier 6, and they are each in contact with the component carrier 6 when the component carrier 6 is clamped correctly. However, only two sensors 32 are visible in the selected representation. The sensors 32 are connected to a display panel 34, which has a control lamp 36 assigned to each sensor 32, which transmits an optical signal in the case of correct or defective positioning. To secure the component carrier 6 in its position, a spring tongue 38 is provided, which is arranged with an end section between the head section of the base body 16 and the receptacle 28 and engages with its free end section in the edge area of the fastening surface 30.

The adapter 12 has an approximately L-shaped design and has a joining surface 40 closely contoured to the convex surface 10 as well as a flat connecting surface 42. It has a basic body 44 made of a translucent material, for example quartz glass. The joining surface 40 is made of another translucent material and is applied as a coating on the basic body 44. In the depicted exemplary embodiment shown in FIG. 2, the joining surface 40 covers approximately the entire convex surface 10 facing it. The adapter 12 is connected by means of a respective adhesive connection to the convex surface 10 of the component 4 and to that of the fastening surface 30 of the component carrier 6. To establish the adhesive connections between the joining surface 40 and the convex surface 10 as well as between the connecting surface 42 and the fastening surface 30, a suitable adhesive 46 is provided, which defines respectively an adhesive gap s1, s2 between the adapter 12 and the component 4 as well as between the adapter 12 and the component carrier 6, wherein the adhesive gap s1 between the component 4 and the adapter 12 is adjusted with an optimal thickness.

To secure the adapter 12 in its aligned position, a plurality of spring elements 48 are provided, which are supported on a protective hood 50 of the joining device 2 and engage on an adapter surface 52 opposite from the joining surface 40 or on an adapter surface 54 opposite from the connecting surface 42. The protective hood 50 delimits a working space 56 and is arranged on an end section of an axis 60 extending through a borehole 58 of the base body 16. The axis 60 is displaceable in the borehole 58 via bearings 62 inserted in radial stepbacks of the borehole 58 along its longitudinal axis 64 and swivelable around its longitudinal axis 64. The working space 56 is closed if the protective hood 50 is in contact with a limit stop 66 inserted into the base body 16.

To cure or release the adhesive connections, a radiation source 70 is arranged on a rear wall 68 of the protective hood 50, which emits electro-magnetic radiation 72 such as light in the direction of the component 4 and through the adapter 12.

According to the sectional representation in FIG. 2, the receptacle 28 is designed to be U-shaped with a left side frame 74 and a right frame 76, which are connected to each other via a crosspiece 78. The component carrier 6 is designed to be rectangular and is spaced apart from the receptacle 28 on the circumferential side. Two setting screws 80, 82 are provided to align the component carrier 6 in the receptacle 28 in the z-direction and in the x-direction. The thread base 86 of the setting screw 80 impinges on a side surface 88 of the component carrier 6 in the z-direction and is guided into an internal thread borehole 84 of the left side frame 74. The setting screw 82 for positioning the component carrier 6 in the x-direction is guided in an internal thread borehole 90 of an arm 92 in the region of the right side frame 76 and also engages with its thread base 94 on a side surface 96 of the component carrier 6. In order to insert the component carrier 6 into the receptacle, the arm 92 is swivel-mounted on a front surface 98 of the right side frame 76. To this end, the arm 92 has a throughborehole 100, through which a clamping screw 104 defining a swivel axis 102 is guided, which clamping screw is in operative engagement with an internal thread 106 of the right side frame 76. A similar swivelable arm 108 is positioned in the region of the left side frame 74 on the front side, however, this arm 108 does not have a setting screw 82. Checking the alignment of the component carrier 6 is carried out by means of the six sensors 32, which engage in the edge section of the component carrier 6 on the same.

The component 4 is arranged between the application system 14 and the adapter 12. In the depicted section, the component 4 is situated with its concave surface 8 in contact with two sensors 22, which engage in the region of a blade root 110 and a shroud 112 of the component 4. In the region of the convex surface 10, the component 4 is connected to the joining surface 40 of the adapter 12 by means of the adhesive 46.

The adapter 12 is pre-stressed in the direction of the component 4 by means of the spring elements 48, which dip in sections in recesses 114 of the protective hood 50 and are supported on the base of the recesses 114.

In the depicted U-shaped cross-section, the protective hood 50 has two side walls 116, 118, which are connected to each other via the rear wall 68. The recesses 114 for receiving the spring elements 48 are configured on the front side in the side walls 116, 118. To guide the adapter 12 in the z-direction, a finger 124, which engages on a side surface 126, 128 of the adapter 12, is arranged on each outer surface 120, 122 of the side walls 116, 118 that face away from each other. A handle 132 is arranged on the outer surface 130 of the protective hood 50 that faces away from the radiation source 70 in order to move or open and close the working space 56 in a simple manner.

A preferred exemplary embodiment of a method according to the invention for connecting the component 4 to the component carrier 6 is described in the following: First, the component carrier 6 is inserted into the receptacle 28 and positionally fixed by means of the setting screws 80, 82. Then the component is positioned on the application system 14 of the joining device 2. The adapter 12 is subsequently made available and is provided with the adhesive 46 on its joining surface 40 and its connecting surface 42. Then the adapter 12 is moved in direction of the component 4, and an adhesive connection is established between the joining surface 40 of the adapter 12 and the convex surface 10 of the component 4 while adjusting an optimum adhesive gap s1. Then the adapter 12 is aligned with component carrier 6 while maintaining the adhesive gap s1 and an adhesive connection is established between the connecting surface 42 of the adapter 12 and the fastening surface 30 of the component carrier 6. At the same time, the correct position of the component 4 on the application system 14 and the correct position of the component carrier 6 in the receptacle 28 are checked via the control lamps 26, 36 of the display panels 24, 34. After establishing the adhesive connections, the working space 56 is closed by an operation of the protective hood 50 and the adapter 12 is secured in its aligned position by means of the spring elements 48. As soon as the working space 56 is closed and the component 4, the adapter 12 and the component carrier 6 have not changed their alignment with respect to one another, the radiation source 70 is triggered and the adhesive 46 begins to cure due to the radiation 72 being emitted. After curing, the radiating is ended and the working space 56 is opened via an operation of the protective hood 50. The component carrier 6 with the attached adapter 12 and the component 4 is removed from the joining device 2 and clamped in a subsequent processing machine for processing the component 4.

After processing the component 4 in the processing machine, the adhesive connection between the adapter 12 and the component 4 as well as between the adapter 12 and the component carrier 6 is released by means of thermal radiation for example, and the component carrier 6 is ready to be reloaded and therefore to be used again in the joining device 2.

A joining device for arranging a component on a component carrier is disclosed comprising an application system for positioning the component in the joining device and with a receptacle for clamping the component carrier in the joining device, wherein the component is arranged on the component carrier by means of an adapter, and a method for arranging the component on the component carrier is also disclosed.

The invention claimed is:

1. A method for arranging a component on a component carrier, comprising the steps of:
   aligning and fixing the component carrier in a receptacle of a joining device;
   positioning the component on an application system of the joining device, wherein the application system is configured on a side section of a base body of the joining device and wherein a base section of the base body of the joining device is supported on a work floor;
   providing an adapter between the component and the component carrier, wherein the adapter has an L-shaped body with a contoured surface and a flat surface;
   wherein the application system and at least a portion of the adapter are disposed on opposite sides of the component;
   establishing an adhesive connection between the contoured surface of the adapter and the component while adjusting a target gap between the contoured surface of the adapter and the component;
   establishing an adhesive connection between the flat surface of the adapter and the component carrier while maintaining the target gap between the contoured surface of the adapter and the component;
   curing the adhesive connection between the contoured surface of the adapter and the component; and
   curing the adhesive connection between the flat surface of the adapter and the component carrier.

2. The method according to claim 1, wherein the curing steps include radiation.

3. The method according to claim 2, wherein the radiation includes varying radiation.

\* \* \* \* \*